United States Patent [19]
Ghafoor et al.

[11] Patent Number: 6,031,037
[45] Date of Patent: Feb. 29, 2000

[54] POLYMERIC COMPOSITIONS AND THEIR PRODUCTION AND USES

[75] Inventors: Mark Sirfaraz Ghafoor; Malcolm Skinner; Ian Michael Johnson, all of West Yorkshire, United Kingdom

[73] Assignee: Ciba Specialty Chemicals Water Treatments Limited, Bradford, United Kingdom

[21] Appl. No.: 09/008,999

[22] Filed: Jan. 20, 1998

[30] Foreign Application Priority Data

Jan. 20, 1997 [GB] United Kingdom .................. 9701090
Dec. 17, 1997 [GB] United Kingdom .................. 9726675

[51] Int. Cl.$^7$ ..................................................... C08G 75/14
[52] U.S. Cl. ........................................................ 524/388
[58] Field of Search ............................................... 524/388

[56] References Cited

U.S. PATENT DOCUMENTS

| | | | |
|---|---|---|---|
| 4,176,107 | 11/1979 | Buckman et al. | 260/29.6 E |
| 4,380,600 | 4/1983 | Hosoda et al. | 524/458 |
| 4,929,655 | 5/1990 | Takeda et al. | 524/458 |
| 5,006,590 | 4/1991 | Takeda et al. . | |
| 5,480,934 | 1/1996 | Braum et al. | 13/2 |
| 5,597,859 | 1/1997 | Hurlock et al. | 524/458 |
| 5,614,602 | 3/1997 | Connors et al. | 526/307.3 |

FOREIGN PATENT DOCUMENTS

| | | | |
|---|---|---|---|
| 2125545 | 12/1994 | Canada | C08F 226/02 |
| 2140817 | 7/1995 | Canada | C08F 2/20 |
| 2143564 | 9/1995 | Canada | C08F 2/20 |
| 0 169 674 | 1/1986 | European Pat. Off. | C08J 3/12 |
| 0 183 466 | 6/1986 | European Pat. Off. | C08F 2/10 |
| 0 525 751 | 2/1993 | European Pat. Off. | C08F 20/60 |
| 0 595 156 | 5/1994 | European Pat. Off. | B01D 17/04 |
| 0 630 909 | 12/1994 | European Pat. Off. | C08F 2/06 |
| 0 637 598 | 2/1995 | European Pat. Off. | C08F 226/04 |
| 06136225 | 5/1994 | Japan | C08L 33/02 |

*Primary Examiner*—Terressa M. Boykin
*Attorney, Agent, or Firm*—David R. Crichton

[57] ABSTRACT

A stable, pourable, liquid composition contains 20 to 60% by weight of a blend of a water soluble high IV polymer and a water soluble low IV cationic coagulant polymer, is selected from polyamines, cationic dicyandiamide polymers and polymers of 70 to 100% ethylenically unsaturated cationic monomer with 0 to 30% by weight acrylamide, and contains 0.01 to 1 part by weight of a water soluble multi-hydroxy compound per part by weight of the coagulant polymer.

16 Claims, No Drawings

6,031,037

POLYMERIC COMPOSITIONS AND THEIR PRODUCTION AND USES

This invention relates to fluid, polymeric, compositions which contain both a high IV non-ionic or cationic polymer and a low IV cationic coagulant polymer, their production and their use.

It is well known to supply and use water soluble, high cationic charge, low IV (intrinsic viscosity) coagulant polymers. Often they are supplied to the customer in the form of aqueous solutions. Although the fact that these materials have relatively low IV and low molecular weight is sometimes an advantage, there are many occasions when it would be desirable if they could additionally perform in a manner that would be more usually associated with higher molecular weight materials.

Higher molecular weight, water soluble, polymers (generally of lower ionic charge) are frequently used as flocculants. Because of their higher IV and molecular weight, it is usually impracticable to supply them as aqueous solutions containing more than, at the most, 5 or 10% by weight polymer since even at 5% concentration the solutions are liable to have high viscosity, and they may even be a rigid gel at higher concentrations. Accordingly flocculant polymers are generally supplied to the customer as powders or as reverse phase emulsions (including dispersions) in oil.

When the customer receives a powder, it is generally necessary for the customer to dissolve that powder in water prior to use, and the dissolution process can be slow and inconvenient. When the customer receives an emulsion, it is again generally necessary to dissolve the polymer of the emulsion into water during use and the resultant solution is contaminated with surfactant and the oil or other continuous phase of the emulsion. This is undesirable.

There have therefore been numerous attempts to provide water soluble, relatively high molecular weight, polymer in an aqueous composition (thereby avoiding the disadvantages of dissolving powder or dealing with the oil continuous phase) wherein the resultant composition has acceptable viscosity but much higher concentration than would be associated with that high molecular weight polymer if dissolved in water.

These attempts Involve suppressing swelling and/or dissolution of the higher molecular weight polymer by modification of the aqueous continuous phase in which it is dispersed and/or by modification of the polymer. Such products are generally referred to as "water-in-water emulsions", even though the physical state of the higher molecular weight material may not necessarily be a true emulsion.

An early disclosure of a water-in-water emulsion is in is U.S. Pat. No. 4,389,600. This describes polymerising monomers in an aqueous phase containing a water soluble polymer. Inorganic salt can be added before or after the polymerisation. Thus, in Example 21, acrylic acid is polymerised in a solution of 100 g water, 15 g PEG, log polyvinyl alcolhol and 15 g NaCl. Although the generic description includes both non-ionic and ionic water soluble polymers for the solution, the polymer which is used as the sole or main polymer in the solution in most of the examples is a polyethylene glycol, for instance having molecular weight which can range from 6,000 to 20,000.

The only named ionic material is polyethylene imine and, in the examples, when this is used it is used solely as a minor component with a much larger amount of non-ionic polymer. It is necessary that the solution viscosity should not be too high (as otherwise the composition is not pourable) and this places severe constraints on the monomers which can be polymerised in the aqueous phase and the IV or molecular weight to which they can be polymerised.

Although U.S. Pat. No. 4,280,600 alleges that the described technique using polyethylene glycol is capable of giving fluid dispersions of high molecular weight polymer, so far as we are aware this process has not proved commercially successful. A reason for this may be that evidence by others has indicated to us that reproduction of an example in it did not lead to a fluid composition but instead led to something which became solid quite quickly. Hydroxy compounds are also mentioned in JP 6136225, EP-A-183,466 and EP-A-630,909.

In EP 169,674 we describe the formation of fluid compositions by milling preformed, high molecular weight, polymer gel of, for instance, cationic polyacrylamide into a continuous phase of, for instance, low molecular weight polymeric DADMAC (diallyl dimethyl ammonium chloride) or polyamine or polyethylene imine. However this necessitated the preliminary formation of aqueous polymer gel and its incorporation into the continuous phase, and it was difficult to obtain a fluid composition that had good storage stability and low viscosity at relatively high polymer content.

Processes are known in which the tendency of the higher molecular weight polymer to swell and dissolve into the aqueous phase is suppressed by copolymerising into that polymer a relatively hydrophobic monomer (for instance U.S. Pat. Nos. 5,403,883, 5,614,602 and 5,480,934 and EP-A-525,751). In other processes various additives are included in the aqueous phase in order to try to control swelling and dissolution of the polymer, for instance polymeric dispersant in CA 2,143,564 and 2,140,817 and polyvalent salt in U.S. Pat. No. 4,929,655 and U.S. Pat. No. 5,006,590, and polymeric dispersant with hydrophobic material in U.S. Pat. No. 5,597,859 and CA-A-2,125,545. However it seems none of these proposals have been widely adopted commercially and the need remains to try to find a satisfactory way of providing an aqueous composition which has adequately low viscosity and yet which contains both coagulant and flocculant in usefully high concentrations and wherein the flocculant can have a usefully high molecular weight.

In EP 262,945 we described forming a cationic polymer by polymerisation within an aqueous phase of, for instance, aqueous polyamine or aqueous poly DADMAC. In the examples, cationic homopolymer was formed. In example 1, a composition was formed of about 12% cationic homopolymer, 12% polyamine and 76% water and the viscosity of the composition was rather low. In another example 2 the composition was formed of about 16% cationic homopolymer, 16% poly DADMAC and 67% water. The viscosity was higher.

It would be desirable to be able to provide a fluid, pourable, stable composition which has a relatively high content of active polymer (i.e., active for the purposes of coagulation or flocculation) and which is in the form of a water-in-water emulsion.

It would be desirable to be able to provide a one-pack composition containing coagulant and flocculant, and it would be desirable Lo provide such a composition which behaves as an improved coagulant.

According to the invention we provide a stable, pourable, liquid composition containing 20 to 60% by weight of a blend of a water soluble high IV polymer and a water soluble low IV cationic coagulant polymer, wherein the water soluble high IV polymer is a non-ionic or cationic polymer of ethylenically unsaturated water soluble monomer or monomer blend and has an apparent IV (defined below) of at least 2 dl/g and is present in the composition in an amount of 3 to 40% (preferably 3 to 30%) by weight, the water soluble low IV cationic coagulant has an IV (defined below) of not more than 1.5 dl/g and is selected from polymers of 70 to 100% by weight ethylenically unsaturated water soluble cationic monomer and 0 to 30% by weight acrylamide, polyamines and cationic dicyandiamides polymers, and is present in the composition in an amount of 3 to 40%, preferably 5 to 40%, by weight, and the composition has a viscosity (Brookfield RVT, spindle 6, 10 rpm, 25° C.) of less than 30,000 cps and is a dispersion of the high IV polymer in an aqueous phase which is an aqueous solution of the low IV coagulant polymer and 0.1 to 1 part by weight of a water soluble multi-hydroxy compound per part by weight of the coagulant polymer.

Thus the invention provides an aqueous, oil-free, fluid composition of high IV polymer and which is fluid despite having a high polymer content.

The pourable composition is made by forming the aqueous phase which is the aqueous solution of the coagulant polymer and the multi-hydroxy compound and optionally salt, dissolving the monomer or monomer blend which is to provide the high IV polymer in that aqueous phase and then polymerising the monomer or monomer blend to form the high IV polymer dispersed in the aqueous phase.

The composition is stable, pourable and liquid in the sense that substantially no permanent settling occurs when the composition is allowed to stand for several weeks and the composition has a sufficiently low viscosity that it can be poured. Preferably no sedimentation occurs, but if any sedimentation does occur the sedimented phase is capable of being re-suspended by simple stirring. The viscosity of the composition is preferably below 25,000 cps, most preferably below 20,000 cps and often below 12,000 cps. It can be as low as, for instance 1,000 cps but is generally above 2,000 cps.

The composition preferably has the form of a clear liquid or an opaque liquid. It is substantially free of gel or lumps. If such gel or lumps form then it is necessary to modify the aqueous phase so as to achieve the desired pourable liquid state. For instance the amount of coagulant polymer or multi-hydroxy compound may be varied or inorganic salt may be included, as discussed below.

The high IV polymer may be formed solely from acrylamide (so that it is substantially non-ionic) or solely from cationic monomer, but usually is formed from a blend, for instance of 0 to 100% by weight acrylamide and/or other water soluble non-ionic monomer and 0 to 100% by weight water soluble ethylenically unsaturated cationic monomer. The amount of cationic monomer is usually 1 to 100% by weight, so that the amount of acrylamide is generally 0 to 99%. Preferred polymers contain acrylamide and so preferably contain 1 to 99%, preferably 5 to 95%, of each of acrylamide and cationic monomer. The cationic polymer can be a cationic amphoterric polymer in which event ethylenically unsaturated anionic monomer is included in the monomer blend in an amount which is less than the amount of cationic so as to give a cationic amphoterric polymer. The anionic monomer may be an ethylenically unsaturated carboxylic monomer or a sulphonic monomer, e.g., acrylic acid or AMPS.

Preferred polymers contain at least 40% acrylamide by weight and preferably at least 50% by weight acrylamide and not more than 60% and preferably not more than 50% cationic. This cationic monomer can be a diallyl quaternary monomer (generally diallyl dimethyl ammonium chloride, DADMAC) but preferably is a dialkylaminoalkyl (meth) -acrylate or -acrylamide wherein the alkyl and alkylene groups are usually C1–3, generally as an acid addition or quaternary ammonium salt. For instance it may be dimethylaminoethyl acrylate or methacrylate usually as a quaternary ammonium salt or dimethylaminopropyl—acrylamide or -methacrylamide, again generally as quaternary salt. The quaternising group is usually methyl chloride or other aliphatic group. Preferably the high IV polymer is substantially free of hydrophobic, solubility-reducing, groups such as C4 alkyl or higher, e.g., above C8 or aromatic (such as benzyl) groups on the quaternary nitrogen or elsewhere since such materials are unnecesary in the invention and reduce the cost-performance benefit of the products.

Preferably the amount of cationic monomer is 5 to 45% and the amount of acrylamide is 55 to 95%. If desired small amounts of other ethylenically unsaturated monomers (non-ionic or anionic) can be included in the monomer blend but this is usually unnecessary and the polymer conveniently is formed from the binary blend or from acrylamide alone.

The high IV cationic polymer can be made in the presence of a small amount of cross linking agent so as to give products which have an ionic regain of at least 20%, as described in EP-A-202,780.

The high IV polymer is formed by polymerisation in the composition under conditions such that it has an apparent IV of at least 2 dl/g and usually considerably more. For instance usually it has an apparent IV of at least 4 dl/g and thus its molecular weight is sufficiently high that it will contribute useful bridging flocculation properties when used for treating a suspension. The apparent IV is often above 5 dl/g up to 14 dl/g or higher. Generally it is in the range 5 to 12 dl/g.

All these values are the apparent IV, that is to say the intrinsic viscosity as determined by observation of viscosities of aqueous compositions prepared from the whole composition of the invention in one molar sodium chloride buffered to pH 7.5 at 25° C. using a suspended level viscometer, wherein the apparent IV is determined by calculation based on the weight of the high IV polymer in the composition. Thus if, for instance, the composition contains 10% by weight of the acrylamide polymer the entire composition is utilised for preparing the solution required for IV measurements but the amount of polymer in such solutions, when calculating the IV, is assumed to be lot by weight of the composition.

The water soluble low IV cationic coagulant has an IV of not more than 1.5 dl/g as measured using a suspended level viscometer on solutions of the coagulant polymer alone in 1 molar sodium chloride buffered to pH 7.5 at 25° C. Although higher IV coagulant polymers could be used, they will tend to increase unnecessarily the product viscosity (for instance as measured by a Brookfield viscometer), and so it is best to use coagulant polymers having IV below 1 dl/g. Generally the IV is below 0.7, and sually below 0.5 dl/g. The coagulant polymer can have such a low molecular weight, for instance 10,000, that it does not have a sensibly measurable IV.

The coagulant polymer can be a polyamine coagulant polymer, for instance the polymers made by condensation of a monoamine and/or a diamine and/or triamine or higher amine (e.g., ethylene diamine or tetraethylene pentamine) with epichlorohydrin or other epihalohydrin or with dichloroethane or other dihaloalkene. Preferred polyamines are formed by condensation of epichlorhydrin with dimethylamine and a small amount of ethylenediamine or other multi-amine to cause cross linking.

The coagulant polymer can be a homopolymer or a high cationic copolymer of water soluble ethylenically unsaturated cationic monomer optionally with a comonomer, usually not more than 30% by weight acrylamide. The ethylenically unsaturated cationic monomers can be any of those cationic monomers discussed above but the monomer is preferably diallyl dimethyl ammonium chloride. Generally it is a homopolymer or a copolymer of at least 80 and usually at least 90% DADMAC with the balance being acrylamide.

Preferably the coagulant polymer is substantially free of hydrophobic, solubility-reducing groups such as C4 or higher (e.g., above C8) alkyl or aromatic groups on the quaternary nitrogen.

The coagulant polymer can be a polydicyandiamide, i.e. a cationic dicyandiamide copolymer.

The only essential polymers which are present in the invention are preferably conventional water soluble high IV and water soluble low IV polymers, together with the water soluble polyethylene glycol. Thus, in the invention, it is preferred that there is no deliberate addition of a polymer which contains hydrophobic groups and which will therefore have a significantly lower solubility in water than conventional water soluble coagulant and flocculant polymers.

When referring to a water soluble monomer we mean that the monomer has conventional high solubility at 25° C., generally above 5 or 10% in deionised water, and similarly a water soluble polymer has conventional high water solubility typically of above 5 or 10% in deionised water, at which concentrations it may form a gel when the IV is high.

The aqueous phase in which the high IV polymer is dispersed is a solution in water of the coagulant polymer and a water soluble multi-hydroxy compound and, optionally, an inorganic salt. The water soluble multi-hydroxy compound can be selected from a wide variety of dihydroxy, trihydroxy and higher hydroxy compounds. These may be monomeric, such as glycerol, or polymeric, such as polyvinyl alcohol or polyethylene glycol. Preferably however the multi-hydroxy compound should be a material which gives a low solution viscosity and so is preferably glycerol or a relatively low molecular weight polyethylene glycol. Preferably the polyethylene glycol has a molecular weight sufficiently low that it is a liquid, typically molecular weight below 1,000, e.g., 200. However if desired higher molecular weight polyethylene glycols can be used, for instance 6,000, 8,000 or 10,000, but generally it is undesirable to use a polyethylene glycol having molecular weight more than about 4,000.

The amount of the multi-hydroxy compound is usually kept relatively low because high amounts are unnecessary and the material is usually inert as regards the flocculation or coagulant activity of the final composition and so increasing the amount of it unnecessarily increases the cost of the composition. The amount of the multi-hydroxy compound is therefore not more than 1 part per part by weight of the coagulant polymer and usually the amount is not more than 10% by weight of the total composition, and often below 6%. If the amount is too low in any particular composition, the composition may gel or otherwise become non-pourable and so usually the multi-hydroxy compound is present in an amount of at least 1% by weight of the composition. Often the amount of multi-hydroxy compound is 0.05 to 0.5 parts, often around 0.08 to 0.2 parts, per part by weight of the coagulant polymer.

It is often desirable to include inorganic salt in the aqueous phase in order to promote the formation of a fluid stable composition and to depress the viscosity of the composition. Any viscosity-reducing water soluble inorganic salt can be used, but for simplicity the salt is usually an alkali metal or ammonium chloride or sulphate, preferably ammonium sulphate or sodium chloride. When sufficient of the polyhydroxy compound is being used there is usually no benefit in including more than 2 parts by weight of the salt per part by weight coagulant but it can be as much as 4 or even 6 parts. Generally the amount is below 1 part, preferably below 0.6 parts per part by weight coagulant. Usually it is at least 0.01 parts and often at least 0.03 parts per part by weight coagulant. When the amount of salt is expressed on the basis of the total composition, the amount is usually at least 0.5%, frequently at least 2%, but generally it does not have to be more than about 10 or 15%, but in some instances it can be up to 20% or even 30 or 35%. Some of the salt can be introduced with the monomer or monomer blend, but most or all of the salt is usually introduced in the solution of coagulant polymer.

The salt is usually a water soluble inorganic salt such as an ammonium or alkali metal or alkaline earth metal chloride, bromide or iodide (such as $MgCl_2$, NaCl, $NH_4Cl$), polyaluminium chloride or a sulphate such as ammonium sulphate.

Compositions of the invention can contain more high IV polymer than coagulant polymer, e.g., a ratio of 1:0.1 to 1, usually 1:0.5 to 1. This applies particularly when salt is present in the coagulant solution, for instance in an amount above 10% or 15% by weight of the composition. The amount of flocculant can then be 10–35% and the amount of coagulant can be 3 to 10%.

Preferably however the amount of salt is below 10% or 15% (for instance 0–2%). The amount of high IV polymer is usually not more than the amount of the cationic coagulant polymer and is preferably less than the amount of coagulant. Generally the composition contains 0.1 to 1 part, often 0.2 to 0.7, eg 0.4 to 0.7, part of the high IV polymer per part by weight of the cationic coagulant polymer.

The amount of the cationic coagulant polymer is then usually at least 12% by weight of the composition and often at least 15%. Generally it is not more than 30% and is often below 25%.

The amount of the water soluble high IV cationic polymer is usually at least 5% and preferably at least 7%. It is often below 20%. Good results are frequently obtained with amounts in the range 8 to 18%, by weight of the total composition.

The amount of water in the composition is generally in the range 30 to 75% often around 50 to 70%. The amount is often 2 to 5 parts per part by weight of coagulant polymer.

The necessary polymerisation of the monomer or monomer blend in the aqueous phase can be initiated utilising thermal initiator or redox initiator. Initiator may be added both to start the reaction and during the reaction. It is added in an amount and at a time which will result in the polymer having the chosen IV.

One property of the preferred compositions of the invention is that the viscosity of the composition may increase when a relatively small amount of water is added to it but may then decrease when larger amounts of water are added to it. For instance when the total concentration of high IV acrylamide polymer and low IV cationic polymer is reduced by, say, one third as a result of dilution of the composition with water, the Brookfield viscosity of the resultant composition may be at least two times, and often at least three or four times, the Brookfield viscosity of the composition before dilution, but further dilution to reduce the polymer concentration to, say, one third or one quarter or less of the initial concentration will restore the Brookfield viscosity to its initial value or to a lower value.

The compositions of the invention can be used either by direct addition to a suspension which is to be treated or, more usually, after dilution to a total concentration of high IV polymer and cationic coagulant polymer of generally less than 10% and frequently 0.1 to 5% by weight.

The suspension which is to be treated can be any suspension which can advantageously be treated by the two polymers either individually or in combination. Thus it may be a cellulosic suspension, for instance a paper making suspension wherein the composition is used as drainage aid, or it may be a cellulosic, municipal or industrial waste suspension.

The preferred compositions which contain less high IV polymer (generally formed from 0–50% cationic and 50 100% acrylamide) than coagulant are of particular value as enhanced coagulants, i.e. in a wide variety of applications where cationic coagulant is used and enhanced performance is required. Examples are treating paper mill effluent, sewage sludge treatment and oily water clarification.

The following are examples.

EXAMPLE 1

Preparation of 20% cationic polymer in an aqueous base of poly DADMAC, PEG and salt.

(All wts are for loot active components.)

Into a 250 ml flask fitted with stirrer, condenser, nitrogen purge and thermometer was charged water (130 g), poly DADMAC (39.8 g), PEG 200 (3.5 g) and sodium chloride (5.5 g).

A monomer phase was prepared from ACM (17.0 g) and DMAEA q MeCl (4.2 g). This was added to the flask and the mixture stirred and purged with nitrogen.

The flask and contents were warmed to 50° C. and 4 mls of a 1% aqueous solution of ammonium persulphate added. The reaction was maintained at 50° C. for 1 hour before a second addition of 4 mls of 1% APS solution was added. The reaction was then left a further hour.

The resultant product had a concentration (dry weight) of 35% and a Brookfield viscosity of 11,500 cps.

The apparent IV=10.1 dl/g.

The active content of the product (cationic coagulant +cationic high IV copolymer)≈30.5%.

High IV copolymer content≈10.6%.

In a generally similar manner, other flocculant (high IV) polymers were formed from the materials and with the results shown below.

| Example | Water grams | Salt grams | Polyhydroxy grams | Coagulant grams | Acrylamide grams | Cationic grams | Flocculant + Coagulant | Flocculant | Apparent IV dl/g | Brookfield cps |
|---|---|---|---|---|---|---|---|---|---|---|
| 1 | 130 | 5.5 NaCl | 3.5 PEG 200 | 39.8 polyDADMAC | 17.0 | 4.2A | 30.5% | 10.6% | 10.1 | 11500 |
| 2 | 130 | 5.5 NaCl | 3.5 PEG 4000 | 39.8 polyDADMAC | 12.5 | 8.5A | 30.5% | 10.6% | 5–7 | 16000 |
| 3 | 130 | 5.5 NaCl | 3.5 PEG 200 | 39.8 polyamine | 17.0 | 4.2A | 30.5% | 10.6% | 5.5 | 10600 |
| 4 | 100 | 20 $(NH_4)_2SO_4$ | 10 PEG 200 | 36.8 polyamine | 19.9 | 13.3A | 35% | 16.6% | 3.1 | 19600 |
| 5 | 130 | nil | 9.6 PEG 200 | 39.2 polyDADMAC | 17.0 | 4.2A | 30.2% | 10.6% | 8.9 | 17000 |
| 6 | 100 | 5.6 $(NH_4)_2SO_4$ | 10 PEG 200 | 52.4 polydicyandiamide | 25.4 | 4.6A | 42.1% | 15.9% | 2.0 | 2000 |
| 7 | 130 | 5.5 NaCl | 3.5 PEG 200 | 39.8 polyDADMAC | 17.0 | 4.2B | 30.8% | 10.6% | 5.0 | 26000 |
| 8 | 130 | 5.5 NaCl | 3.5 PEG 200 | 39.8 polyDADMAC | 17.0 | 4.2C | 30.8% | 10.6% | 6.5 | 12000 |
| 9 | 130 | 2.7 NaCl | 7.0 PEG 200 | 39.4 polyamine | 20.9 | nil | 30.1% | 10.4% | 4.5 | 4000 |
| 10 | 130 | 5.5 NaCl | 3.5 PEG 200 | 39.8 polyamine | 17.0 | 4.2A | 30.8% | 10.6% | 8.2 | 10400 |
| 11 | 130 | 5.5 NaCl | 3.5 Glycerol | 39.8 polyDADMAC | 17.0 | 4.2A | 30.5% | 10.6% | 6.4 | 20400 |

In this table, cationic monomer A is dimethylaminoethyl acrylate quaternised with methyl chloride. Cationic monomer B is acrylamido propyl trimethyl ammonium chloride. Cationic monomer C is dimethylaminoethyl acrylate quaternised with benzyl chloride.

All the examples were conducted in generally the same manner, except as follows. In example 4 the reaction was carried out at 60° C. with 2 ml of it aqueous azo catalyst added initially and a further addition after 1 hour. The catalyst was 2,2-azobis (2-amidino propane hydrochloride). The same initiator was used in Example 6. In Example 10 2 mls of it solution of this initiator were used followed by 2 mls of 2.5% solution of potassium bromate and then 3.2 mls of a 5% solution of sodium metabisulphite was added and the reaction allowed to undergo exotherm. The reaction was then warmed to and maintained at 50° C. for 1 hour to ensure full polymerisation.

We claim:

1. A stable, pourable, liquid composition containing 20 to 60% by weight of a blend of a water soluble high IV polymer and a water soluble low IV cationic coagulant polymer, wherein the water soluble high IV polymer is a non-ionic or cationic polymer of water soluble ethylenically unsaturated cationic monomer or monomer blend and has an apparent IV of at least 2 dl/g as determined by measurements at 25° C. using a suspended level viscometer on solutions in a 1 molar sodium chloride solution buffered to a pH of 7.5 and is present in the composition in an amount of 3 to 40% by weight, the water soluble low IV cationic coagulant has an IV of below 1.5 dl/g as determined by measurements at 25° C. using a suspended level viscometer on solutions in a 1 molar sodium chloride solution buffered to a pH of 7.5 and is selected from polyamines, cationic dicyandiamide polymers and polymers of 70 to 100% ethylenically unsaturated cationic monomer selected from the group consisting of diallyl dimethyl ammonium chloride, dialkyl amino alkyl (meth) acrylates (including acid addition salts and quaternary ammonium salts) and dialkyl amino alkyl (meth) acylamides (including acid addition salts and quaternary ammonium salts) with 0 to 30% by weight acrylamide, and is present in the composition in an amount of 5 to 40% by weight, and the composition has a Brookfield viscosity of less than 30,000 cps as measured using spindle 6 at 10 rpm at 25° C. and is a dispersion of the high IV polymer in an aqueous phase which is an aqueous solution of low IV coagulant polymer and 0.01 to 1 part by weight of a water soluble multi-hydroxy compound per part by weight of the coagulant polymer.

2. A composition according to claim 1 in which the amount of multi-hydroxy compound is 1 to 10% by weight of the composition and 0.05 to 0.5 parts per part by weight of the coagulant polymer.

3. A composition according to claim 1 or claim 2 in which the multi-hydroxy compound is selected from glycerol and polyethylene glycol.

4. A composition according to any preceding claim in which the amount of the high IV polymer is 0.1 to 1 part per part by weight of the cationic coagulant.

5. A composition according to any preceding claim in which the amount of high IV polymer is 0.4 to 0.7 parts per part by weight of the cationic coagulant and is 5 to 20% by weight of the composition.

6. A composition according to any preceding claim in which the high IV polymer has apparent IV of 5 to 12 dl/g.

7. A composition according to any preceding claim in which the cationic monomer in the high IV polymer is a dialkylaminoalkyl (meth) -acrylate or -acrylamide as acid addition or quaternary salt.

8. A composition according to any preceding claim in which the cationic coagulant is selected from polyamines, cationic dicyandiamide polymers and polymers of 80 to 100% by weight DADMAC with 0 to 20% acrylamide.

9. A composition according to any preceding claim in which the aqueous solution also contains water soluble inorganic salt.

10. A composition according to claim 10 in which the amount of inorganic salt is 0.5 to 15% by weight of the composition and is 0.01 to 2 parts per part by weight of the coagulant.

11. A composition according to any preceding claim in which the high IV polymer is a polymer of 0 to 100% acrylamide and 100 to 0% by weight of an ethylenically unsaturated cationic monomer and optionally ethylenically unsatruated anionic monojmer in an amount less than the amount of cationic monomer.

12. A composition according to any preceding claim in which the high IV polymer is a polymer of 50 to 100% acrylamide and 0 to 50% of the cationic monomer and is present in an amount of 3 to 30% by weight of the composition, and the amount of the coagulant is 5 to 40%.

13. A composition according to claim 12 in which the high IV polymer is a copolymer of 5 to 45 by weight ethylenically unsaturated water soluble cationic monomer and 95 to 55% by weight acrylamide.

14. A composition according to any preceding claim in which the composition is free of polymers containing hydrophobic groups which include alkyl containing 4 or more carbon atoms or aryl.

15. A process of making a composition according to any preceding claim comprising dissolving in the said aqueous phase the monomer or monomers which are to be polymerised to form the high IV polymer and then polymerising the monomers.

16. A process of flocculating and/or coagulating a suspension comprising dosing into the suspension a composition according to any of claims 1 to 14 or a dilute solution formed by diluting with water a composition according to any of claims 1 to 14.

* * * * *

UNITED STATES PATENT AND TRADEMARK OFFICE
CERTIFICATE OF CORRECTION

PATENT NO. : 6,031,037  Page 1 of 1
DATED : February 29, 2000
INVENTOR(S) : Mark Sirfaraz Gharfoor et al.

It is certified that error appears in the above-identified patent and that said Letters Patent is hereby corrected as shown below:

--<u>Column 10</u>:
Line 1 of claim 10 should read:
10. A composition according to claim 9 in which the --.

Signed and Sealed this

Twelfth Day of June, 2001

*Attest:*

NICHOLAS P. GODICI
*Attesting Officer*  *Acting Director of the United States Patent and Trademark Office*